April 27, 1954
H. C. HILL
2,676,458
GAS TURBINE COMBINED LUBRICATING AND FUEL SUPPLY SYSTEM
HAVING CENTRIFUGAL MEANS TO PURIFY AND CIRCULATE FUEL
Filed Sept. 17, 1951
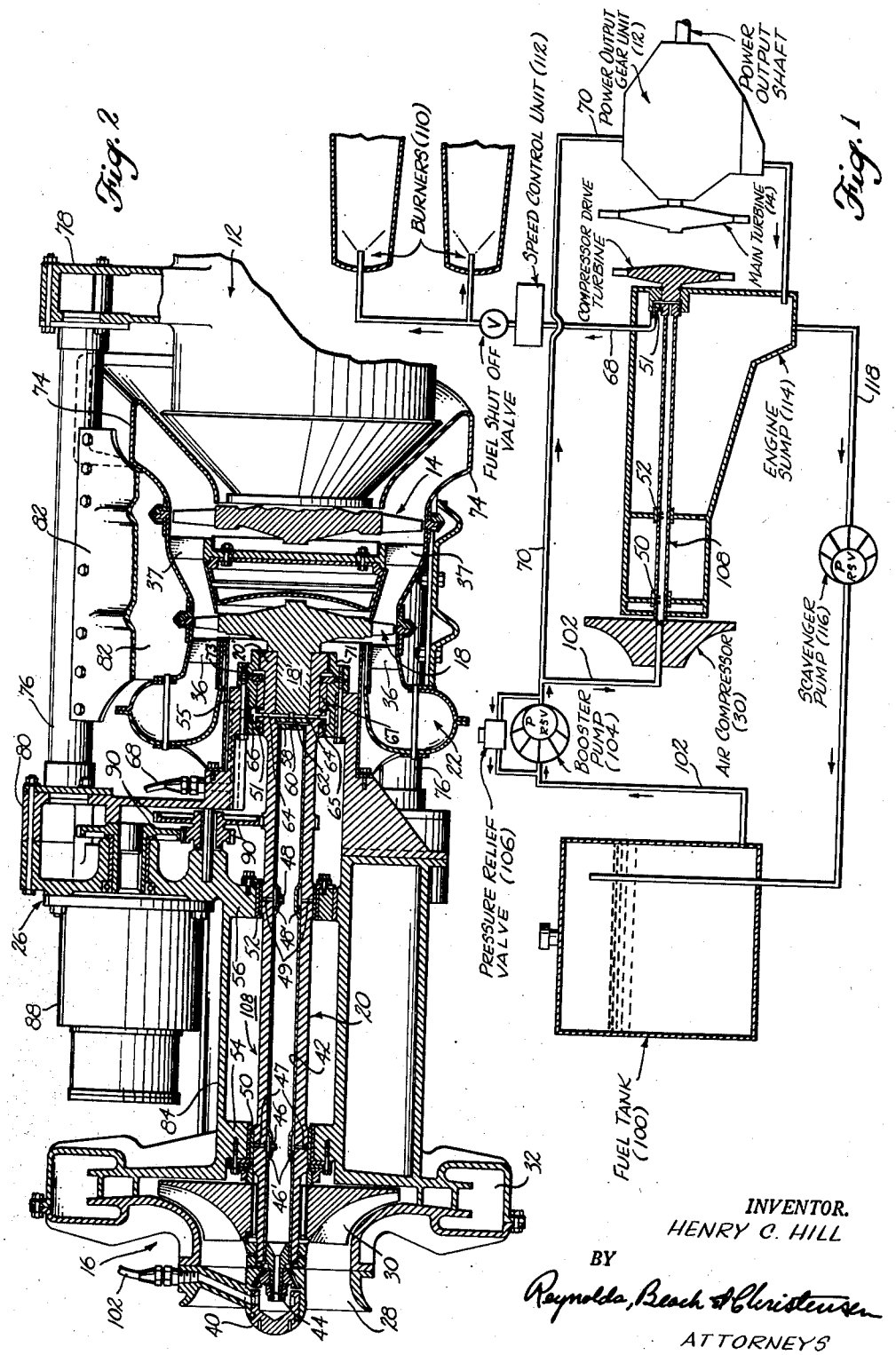
INVENTOR.
HENRY C. HILL
BY
Reynolds, Beach & Christensen
ATTORNEYS Patented Apr. 27, 1954

2,676,458

UNITED STATES PATENT OFFICE 2,676,458

GAS TURBINE COMBINED LUBRICATING AND FUEL SUPPLY SYSTEM HAVING CENTRIFUGAL MEANS TO PURIFY AND CIRCULATE FUEL

Henry C. Hill, Seattle, Wash., assignor to Boeing Airplane Company, Seattle, Wash., a corporation of Delaware Application September 17, 1951, Serial No. 246,887

12 Claims. (Cl. 60—39.08)

This invention relates to lubricating systems and primarily concerns an improved system and apparatus for lubricating small gas turbine engines. Although herein illustratively described by reference to its application in such engines, it should be understood that the invention in various respects is not necessarily limited thereto.

One of the chief advantages of a gas turbine engine over reciprocating types is its comparatively small size and light weight. Another is its relative simplicity and ease of maintenance. The present invention is aimed generally at widening the margin of advantage of the gas turbine engine particularly in these and other respects.

Specifically, it is an object of this invention to reduce complexity, weight and cost of the gas turbine engine by a system of lubrication which effectively eliminates previous oil cooling problems necessitating separate oil cooling, plumbing, temperature control and flow control equipment.

A related object is a system of lubrication virtually eliminating, or at least greatly reducing, warm-up time of such engines.

Another object is to eliminate use of expensive lubricating oils in such engines and thereby reduce the need of frequent service inspections and maintenance operations having to do with adding and changing of lubricant.

Still another object of the invention is a system of lubricating gas turbine engines wherein a serious reduction or failure of lubrication pressure will be accompanied automatically by a reduction or failure of fuel supply pressure, so that damage to engine bearings is prevented and the attendant reduction or loss of power will give outward warning of difficulties affecting operation of the engine.

Still another object is a simplified and compactly arranged apparatus operable to pump and clean the engine lubricant and fuel while functioning also as a conduit for distributing the same to engine bearings and burners, respectively. A related object is compact light weight apparatus of such a nature housed or incorporated within existing rotating parts of the engine to be rotated operatively thereby and also to save the space and part of the weight normally added by separate pumping and cleaning devices.

An additional object is the provision generally of apparatus internal to a shaft for efficiently cleaning, pumping and distributing lubricant to the shaft bearings for lubrication thereof during rotation of such shaft.

Still another object is lubricant cleaning apparatus adapted for incorporation compactly within a rotating element and for convenient removal from such element in order to remove sediment and foreign material trapped inside the cleaning device.

With these and other objects in view, the invention provides a lubricating system for gas turbine engines broadly contemplating use of the engine fuel also as the lubricant. The liquid fuel, whether kerosene or a fuel oil, contained in the fuel tank is delivered from such tank through common or trunk channels from which it is distributed to the burners and lubricated bearings through appropriate branch connections. A single booster pump and associated pressure relief valve supplying fuel oil under pressure to the engine serve the combined functions of a fuel and lubricant delivery means, thereby eliminating the usual duplication of components for lubrication purposes. An important advantage of the system utilizing fuel as the lubricant and comprising common pumping and distributing channels therefor resides in the greater protection of the engine bearings against burn-out caused by failure of lubricant pressure, as fuel pressure must necessarily fail at the same time. Such an advantage is not found in ordinary engines wherein separate systems of lubrication require separate pumps and separate controls which may fail independently of one another.

After being used as lubricant the fuel oil is caught in the engine sump and returned by a scavenger pump to the fuel tank to mix with the cooler fuel oil in the tank. Because fuel tanks for gas turbine engines are relatively large, or the fuel is frequently replenished, the temperature rise in the tank caused by heat rejection from the engine through the returned fuel oil lubricant will not be objectionably great. Thus the fuel tank serves also as the lubricant cooler, and the usual separate oil cooler is done away with.

Further features of the invention reside in special apparatus internal to the engine for cleaning, pumping and distributing lubricant to engine bearings and the burners. A tubular member mounted inside a hollow compressor shaft receives the fuel oil from the booster pump and by rotating with the shaft acts as a centrifuge forming a core of pure fuel oil in the vicinity of its axis while solid particles and foreign matter are forced outward centrifugally to be trapped along the periphery of the tube. Radial tap pipes located at the shaft bearings communicate through the tube wall between its core region and the bearing interfaces. Such tap pipes likewise rotating at the tremendous speed of the compressor shaft function as individual centrifugal pumps forcing the pure fuel oil from the core region of the tubular member outwardly into the bearings for lubrication and cooling thereof. A separate inbuilt centrifugal pump formed directly in the hub assembly of the compressor drive turbine on the compressor shaft forces pure fuel oil from the core region of the cleaner tube for delivery as fuel to the burners.

The foregoing and other features, objects and advantages of the invention including certain details of construction of its preferred, illustrative form will become more fully evident in the following description referring to the accompanying drawing.

Figure 1 is a schematic diagram of a gas turbine engine lubricated in accordance with the improved lubricating system.

Figure 2 is a longitudinal sectional view of the engine illustrating certain details of the apparatus incorporating additional features of the invention.

Referring first to Figure 2 which illustrates various features of a gas turbine engine employing the invention, the power output section of the engine includes a power output shaft (Figure 1), the power output gear box 12 and the main power turbine wheel 14 which drives the shaft through the gear unit 12. The gas-producing section of the engine generally comprises the air compressor 16, the first-stage turbine 18 driving the air compressor by means of the shaft 20, the nozzle box 22, burner ducts (not shown) interconnecting the nozzle box and the air compressor, and the various auxiliary components and mount 26 therefor.

At the head end of the engine air is admitted into the compressor 16 through a throat 28, and by centrifugal pumping action of the vaned wheel 30, is driven into the annular collector chamber 32. The compressed air is conducted from the collector chamber into burner ducts (not shown). The hot gases of combustion pass into the turbine nozzle box 22 extending annularly around the hub of the turbine wheel 18 mounted on compressor shaft 20. Such gases then flow generally parallel to the turbine axis through turbine nozzles 36 directed against the blades of the first-stage turbine 18. Power thus generated drives the air compressor wheel 30 by means of the shaft 20. The hot gases passing the blades of turbine wheel 18 next pass through a second set of turbine nozzles 37 for direction against the blades of the primary turbine 14, before passing out through exhaust ducts 74 into the atmosphere.

As described and claimed in my copending patent application Serial Number 234,997 filed July 3, 1951, the power output and gas producing sections of the particular engine illustrated are supported in fixed relation to each other by a frame structure comprising three triangularly arranged longitudinal frame members 76 disposed symmetrically with relation to the longitudinal axis of the engine, two such members appearing in Figure 2. As shown in this figure, the right-hand ends of these tubular frame members 76 are rigidly fastened to projecting portions 78 of the output gear housing 12. The opposite or left-hand ends of the frame members 76 are correspondingly connected to the frame partition 80 located adjacent the turbine nozzle box 22. This transverse partition also serves as a housing for auxiliary component drive gearing 90 and as a mount for the auxiliary components including starter-generator unit 88, booster and scavenger pumps (not shown) and other auxiliary components. Triangularly arranged web plates 82 bridge between the frame members 76 to stiffen the frame as a symmetrical structure capable of resisting vibrational and torque displacement tendencies.

Referring to both figures, the principal parts of the engine requiring lubrication include the three compressor shaft bearings 50, 51 and 52, and rotating elements supported by and within the power output gear unit 12. The bearings 50 and 52 are received in journals 54 and 56, respectively, carried by a sleeve 84 in the frame of the gas-producing section of the engine. A journal 55 supported by the partition structure 80 carries the bearing 51. These bearings are illustrated as plain sleeve-in-collar bearings to permit larger shaft diameters and reduced bearing costs, although it will be understood that the particular type of bearing used in the engine is no part of this invention. The auxiliary component drive gearing 90 inside the partition structure 80 also requires lubrication, and preferably receives its lubricant in the same manner and through branch connections similar to those associated with the output gear unit 12 as will be described.

In accordance with the present invention fuel oil, kerosene or other liquid fuel in the fuel tank 100 is pumped and delivered through a common or trunk channel to the engine for distribution both as the lubricant and burner fuel. This common channel includes the conduit 102, the booster pump 104 in such conduit and by-passed by the pressure relief valve 106, and special purifying and pumping apparatus, generally designated 108, located internally of the compressor shaft 20. By this internally mounted special apparatus, as described hereinafter in greater detail by particular reference to Figure 2, the fuel oil is purified, pumped and distributed to the bearings 50, 51 and 52, to the power output gear unit 12 and to the burners 110. A speed control unit 112 of suitable form is interposed in the fuel supply line 68 between the burners and the apparatus 108 to permit adjusting and controlling the speed and power of the engine. All lubricated bearings and parts are connected for drainage into the engine sump 114. A scavenger pump 116 in the return conduit 118 delivers the heated lubricant in the sump back into the fuel tank through such return conduit as shown.

A conduit 70 branching from the conduit 102 delivers fuel-lubricant at booster pump pressure to the power output gear unit 12, wherein the lubricant is purified by centrifugal separator means associated with the shaft of turbine 14 similar to centrifugal separator 108, before being delivered to the bearings in such gear unit.

In such a system engine and bearing friction heat rejected through the lubricant is largely dissipated in the fuel tank 100. Temperature in the tank, acting as a heat reservoir, will slowly rise until the heat losses in the lines and tank together with the heat carried back into the engine with the fuel balance the amount of heat rejected by the engine through the lubricant. As previously mentioned, since the fuel tanks for gas turbine engines will be relatively large or the fuel frequently replenished, and further since the heat rejection from such an engine is relatively small, the temperature of fuel-lubricant leaving the tank and delivered back to the engine for use as lubricant will not rise beyond acceptable limits for such a lubricant. The improved lubricating system therefore does away with the usual oil cooler common to all engines of conventional type and thereby saves weight, space and cost. Another advantage of the improved system is the saving of a pump, piping and flow control equipment ordinarily required for the separate lubrication system in conventional engines.

The various considerations involved in the lubrication and supply of fuel to gas turbine engines are resolved favorably to the combination of functions in the present system. Fuel oil, for instance, having a lower viscosity than ordinary lubricating oils, is better able to act as a bearing coolant, yet adequately lubricates as well in the case of the instant system because of the very high speed and light loading of the rotating turbine parts. Moreover, with light fuel oil as the lubricant, the pressure of lubrication need not be as great as with the heavier oils; hence the improved system provides satisfactory lubrication even at the lower pressure (about 20 to 30 pounds per square inch) under which the lubricant-fuel is delivered to the burners, as desired.

A particularly important advantage in such a system is the resulting protection against possible bearing destruction through failure of lubricant pressure. When lubricant pressure fails for some reason such as failure of the booster pump 104, sticking of the pressure relief valve 106 in open position, or blockage in the common or trunk channel including conduit 102, for instance, the supply of fuel under pressure to the burners 110 will also necessarily have failed because of the reliance upon a common lubricant and fuel supply channel. Thus the engine will slow down or stop altogether and the attendant outward indications will be a sufficient notice to the operator of functional difficulties. Thus the usual inconvenience and uncertainties of maintaining a constant watch over lubricant pressure by reference to a meter or gauge are thereby overcome.

The lubricant-fuel is delivered into the engine through a demountable hollow receptacle unit 40 (Figure 2) mounted at the hub of the compressor wheel 30 in alignment with the shaft 20. The hollow compressor shaft 20 receives an elongated dirt collector or separator tube 42 extending substantially throughout the full length of such shaft. The left-hand end of this elongated tube or liner sleeve carries an inlet nozzle 44 which enters the receptacle 40 to admit lubricant therefrom into the interior of the tube. The tube is appropriately fitted or otherwise secured inside the compressor shaft 20 so that it rotates therewith. As it does so at the high speed of the shaft 20, the fuel-lubricant in the tube is subjected to centrifugal force. The heavy foreign elements including dirt, sludge and undesired impurities in the liquid are subjected to a higher centrifugal force than the lighter pure liquid, hence are crowded outward against the inside periphery of the tube 42 while the pure liquid remains in the core region of such tube. This is true throughout the length of the tube.

This purified fuel oil is tapped off from the core region at appropriate locations along the length of the cleaner tube 42 for delivery to the various bearings and the engine burners. The bearing 50 receives its lubricant from the central core region of tube 42 through a tap pipe 46 located far enough from the inlet end of the tube that centrifugal forces have had sufficient opportunity to effect a separation of impurities from the oil during its generally axial flow along the tube. An annular duct 46' formed around the tube 42 at the location of the tap pipe 46 acts as a collector duct which receives the lubricant passing outward through such pipe. Such lubricant next passes outward through a plurality of circumferentially spaced radial bores 47 in the shaft 20 into the bearing interface for lubrication and cooling thereof. The open inner end of the tap pipe 46, terminating in the vicinity of the longitudinal axis of the shaft 20, draws off only the purified lubricant in the core region of tube 42. Because the pipe 46 is rotating at shaft speed, it functions as a centrifugal pump forcing lubricant into duct 46', and for the same reason radial bores 47 in shaft 20 also act as centrifugal pumps. The supplemental pumping action thus afforded at the tremendous rotational speeds normal in gas turbine engines (in the vicinity of 36,000 R. P. M.) insures adequate lubricating pressure for bearing 50. The bearing 52 is similarly lubricated by the associated tap pipe 48, collector duct 48' and radial bores 49 in the shaft wall at the location of such bearing.

The end of the compressor shaft 20 mounting turbine 18 is journaled in a combined thrust bearing and centrifugal pump. The end flange 20' of the shaft 20 has an annular rib 65 extending around its outer periphery. This rib constitutes the shaft locating or retaining element of the thrust bearing assembly, being clamped between antifriction bearing rings including the segmented ring 67 on one end of such rib and the ring 51 on the opposite side thereof, both such rings being retained within the fixed supporting journal or collar 55, as shown. Suitable seals and spacer elements, including the end seal 71, and the spacer ring 73, are employed as shown in the drawing. The side of the ring 51 opposite the rib 65 is spherically rounded and engages a complementally rounded face formed inside the collar 55.

A centrifugal pump formed in the foregoing hub assembly of turbine 18 comprises a plurality of radial bores 64, extending through the mutually overlapping turbine stub shaft 18', compressor shaft flange 20' and the rib 65 on such flange. A central axial bore 60 in the end closure 58 of separator tube 46 admits pure lubricant in the core region of such tube into the inlet 62 of the centrifugal pump, wherein it enters the inner ends of the radial bores 64. An annular collector duct 66, formed in the journal collar 55, surrounds the annular thrust-bearing rib 65, to receive the fuel-lubricant pumped centrifugally outward in such radial bores for delivery to an outlet conduit 68. The passages between the conduit 68 and the collector duct 66 are indicated by dotted lines in Figure 2. Pressure of the liquid in the collector duct 66 causes seepage thereof through the interface regions of the bearing elements 51, 67, 65 and 55 for lubrication and cooling thereof.

The advantage in terms of simplicity and compactness of combining the elements of a thrust bearing with those of a centrifugal lubricant-fuel pump in the hub assembly of the turbine 18 will be evident. Moreover, locating the bores 64 in the existing larger-diameter or ribbed portion 65 of the shaft flange 20' enables maximum output pressure from the centrifugal pump thus formed to be attained, as such pressure is proportional to the radial extent of such bores.

Moreover, the convenience and other advantages of conducting and purifying the lubricant-fuel inside the hollow compressor shaft 20 for admission into the combined centrifugal pump and thrust bearing in the hub assembly of turbine 18 will likewise be evident. The space inside the compressor shaft necessary to accommodate the various purifying and pumping components described is already available because the need of a large and relatively stiff compressor shaft of minimum weight is met by a hollow, large-diameter shaft.

When the centrifugal separator tube 42 requires cleaning, the receptacle unit 40 may be removed from position to permit withdrawing the tube 42 out of the interior of compressor shaft 20. The tube may then be cleaned with gasoline or other solvent. Because of the relatively large effective trap space for collecting dirt inside tube 42, such cleaning operations need not be frequent.

The fuel shut-off valve in line 68 permits turning off the engine fuel supply without interrupting the engine lubricant supply, so that no damage to the bearings will result while the rotating parts are coasting to a stop or during starting wind-up of the engine.

I claim as my invention:

1. A combined lubrication and fuel supply system for an internal combustion turbine type engine, comprising in combination with a rotative hollow engine shaft having rotational support bearing means, a fuel tank, means conveying fuel from said tank to said engine shaft for admission of such fuel into the shaft interior as a combined conduit and centrifugal purifier of fuel, centrifugal pump means comprising a pump passage extending generally radially of said shaft for rotation therewith at the bearing means location, said pump means passage having a fuel inlet disposed near the shaft axis for drawing purified fuel from the shaft interior and a fuel outlet ejecting such purified fuel into said bearing as lubricant therefor, a second centrifugal pump means comprising a pump passage extending generally radially of said shaft for rotation therewith, said latter pump means passage having a fuel inlet disposed near the shaft axis for drawing purified fuel from the shaft interior and a fuel outlet, and conduit means communicating with said latter outlet for delivering fuel pumped therefrom to the engine combustion chamber.

2. The system defined in claim 1, wherein the rotational support bearing means is located intermediate the ends of the shaft and the corresponding centrifugal pump means comprises a radial duct extending through a side opening in said shaft into the interior of the bearing, said duct being carried by an elongated tubular member extending lengthwise inside the shaft to rotate therewith.

3. The system defined in claim 2, wherein the fuel is admitted into the shaft interior at one end thereof, and the second centrifugal pump means is located at the end of the shaft opposite the fuel admission end thereof, whereby maximum centrifugal purification of fuel is achieved by travelling the entire length of the rotating shaft's interior before reaching such second pump means.

4. In a gas turbine engine, in combination with a hollow compressor shaft having bearings rotationally supporting the same at different locations along the length thereof, lubricating apparatus comprising an axially extending centrifuge duct removably received in the interior of the engine's compressor shaft and rotative with such shaft, closure means in one end of said duct having a central opening therein to admit liquid lubricant into the same, said shaft having side openings therein at the respective locations of said shaft bearings, a plurality of generally radial conduit elements carried rotationally by said duct at the respective locations of such shaft bearings, each such conduit element having an open inner end disposed in the vicinity of the shaft's axis to admit substantially pure lubricant therefrom and an open outer end in communication with a corresponding shaft side opening, to force such pure lubricant outwardly through such side openings into the respective bearings by centrifugal pumping action of said conduit elements during rotation of the shaft, the centrifuge action in said duct forcing heavy impurities in the lubricant outwardly to be trapped along the inside peripheral wall of such duct, and centrifugal pump means at the opposite end of the shaft and driven operatively thereby, centrifugal pump inlet means admitting purified liquid lubricant thereto from the central region of the shaft duct, and centrifugal pump outlet means connected to supply such lubricant to the engine burners as fuel.

5. The gas turbine engine lubricating apparatus defined in claim 4, wherein the centrifugal pump means is formed in the compressor shaft drive turbine hub assembly and comprises a radially apertured annular flange formed on the end of such compressor shaft and a radially apertured turbine stub shaft fitted into said flange and having an axial opening affording communication from the end of such stub shaft into its radial apertures, hence into those of said flange, for admitting liquid lubricant into the same to be pumped centrifugally by rotation thereof.

6. Apparatus for lubricating hollow shaft's bearings, comprising a hollow rotative shaft and a plurality of bearings rotatively supporting the same at different locations along the length thereof, a tubular member removably received inside the shaft and extending lengthwise thereof along and past said bearing locations to rotate with said shaft about a common central axis, closure means at one end of said tubular member having an axial inlet therein to admit liquid lubricant into said tubular member, a plurality of generally radial open-ended conduit elements at the respective bearing locations, carried by said tubular member to project inwardly thereof to the vicinity of said axis and rotate with such member, the wall of said shaft having a plurality of apertures formed therein at locations within the respective bearings for passage of lubricant from the conduit elements outwardly through said apertures into such bearings, rotation of said shaft and tubular member producing centrifuge action on the lubricant within such member to centralize purified lubricant therein along its axis for tapping by said conduit elements, and rotation of such conduit elements with said tubular member producing centrifugal pumping action of such purified lubricant by said conduit elements out into the bearings, the conduit element nearest said inlet being set apart materially therefrom to permit separation of impurities from the lubricant centrifugally before reaching and entering such conduit element by generally axial flow through said tubular member, and combined centrifugal pump and thrust bearing means on the shaft comprising a thrust bearing annular rib extending around and fixed to the shaft's outer periphery and having therein a plurality of generally radial lubricant passages extending through the shaft to inner ends located in the vicinity of the shaft's axis, means admitting pure lubricant from a substantially axial location inside the shaft into the inner ends of said latter lubricant passages for centrifugally pumping such lubricant outwardly through such passages, fixed collar means encircling said annular rib and defining a lubricant collector space therearound, and thrust bearing rings retained inside said collar means adjacent opposite sides, respectively, of said rib and having thrust surfaces engaging the same, such surfaces being lubricated by lubricant forced centrifugally outwardly through said passages into said collector duct and seeping therefrom between such surfaces and the rib surfaces engaged thereby.

7. Apparatus for lubricating hollow shaft's bearings, comprising a hollow rotative shaft and a plurality of bearings rotatively supporting the same at different locations along the length thereof, a tubular member removably received inside the shaft and extending lengthwise thereof along and past said bearing locations to rotate with said shaft about a common central axis, closure means at one end of said tubular member having an axial inlet therein to admit liquid lubricant into said tubular member, a plurality of generally radial open-ended conduit elements at the respective bearing locations, carried by said tubular member to project inwardly thereof to the vicinity of said axis and rotate with such member, the wall of said shaft having a plurality of apertures formed therein at locations within the respective bearings for passage of lubricant from the conduit elements outwardly through said apertures into such bearings, rotation of said shaft and tubular member producing centrifuge action on the lubricant within such member to centralize purified lubricant therein along its axis for tapping by said conduit elements, and rotation of such conduit elements with said tubular member producing centrifugal pumping action of such purified lubricant by said conduit elements out into the bearings, the conduit element nearest said inlet being set apart materially therefrom to permit separation of impurities from the lubricant centrifugally before reaching and entering such conduit element by generally axial flow through said tubular member, shaft-rotated centrifugal pump means mounted on the end of the shaft opposite the closure means and having an inlet drawing purified lubricant from the central region of the shaft's interior, and conduit means conveying such lubricant pumped by said latter pump means to a location remote from said shaft.

8. Combined thrust bearing and centrifugal lubricant pump means for a hollow shaft, comprising means to admit liquid lubricant into the hollow interior of the shaft to be subjected to centrifuge action during shaft rotation, forcing lubricant impurities radially outward while forming a core region of relatively pure lubricant in the vicinity of the shaft's rotation axis, a thrust bearing annular rib extending around and fixed to the shaft's outer periphery and having therein a plurality of generally radial lubricant passages extending through the shaft to inner ends located in the vicinity of the shaft's axis, means admitting pure lubricant from a substantially axial location inside the shaft into the inner ends of said latter lubricant passages for centrifugally pumping such lubricant outwardly through such passages, fixed collar means encircling said annular rib and defining a lubricant collector space therearound, and thrust bearing rings retained inside said collar means adjacent opposite sides, respectively, of said rib and having thrust surfaces engaging the same, such surfaces being lubricated by lubricant forced centrifugally outwardly through said passages into said collector duct and seeping therefrom between such surfaces and the rib surfaces engaged thereby.

9. A fuel supply system for an internal combustion turbine type engine, comprising in combination with a rotative hollow engine shaft having a rotational support bearing means, a fuel tank, means conveying fuel from said tank to said engine shaft for admission of such fuel into the shaft interior as a combined conduit and centrifugal purifier of fuel, centrifugal pump means comprising a pump passage extending generally radially of said shaft for rotation therewith located remotely along said shaft from the admission point of fuel therein, said pump means passage having a fuel inlet disposed near the shaft axis for drawing purified fuel from the shaft interior and a fuel outlet, and conduit means communicating with said latter outlet for delivering fuel pumped therefrom to the engine combustion chamber.

10. The system defined in claim 9, wherein the fuel is admitted into the shaft interior at one end thereof, and the centrifugal pump means is located at the end of the shaft opposite the fuel admission end thereof, whereby substantially the entire length of such shaft interior constitutes a centrifugal separator and collector of fuel impurities.

11. A combined lubrication and fuel supply system for an internal combustion turbine type engine, comprising in combination with a rotative hollow engine shaft having a plurality of rotational support bearings at different locations along the length thereof, a fuel tank, means conveying fuel from said tank to one end of said engine shaft for admission of such fuel into the rotative shaft's interior as a combined conduit and centrifugal purifier of fuel, centrifugal pump means each comprising a pump passage extending generally radially of said shaft at the respective bearing locations for rotation with said shaft, said pump means passages each having a fuel inlet disposed near the shaft axis for drawing purified fuel from the shaft interior and a fuel outlet through the side of the shaft ejecting such purified fuel into the respective bearings as lubricant therefor, further centrifugal pump means having a pump passage extending generally radially of said shaft for rotation therewith, said latter pump means comprising a generally radially extending pump passage rotative with said shaft and having a fuel inlet disposed near the shaft axis for drawing purified fuel from the shaft interior and a fuel outlet, and conduit means communicating with said latter outlet for delivering fuel pumped therefrom to the engine combustion chamber.

12. The system defined in claim 11, wherein the shaft has a bearing located at the position along the shaft of the latter centrifugal pump means adapted to receive, as lubricant, a portion of the purified fuel pumped thereby.

References Cited in the file of this patent

UNITED STATES PATENTS

| Number | Name | Date |
|---|---|---|
| 1,674,191 | Chilton | June 19, 1928 |
| 1,807,830 | Cattaneo | June 2, 1931 |
| 1,874,444 | Carvelli | Aug. 30, 1932 |
| 2,066,452 | Bernard | Jan. 5, 1937 |
| 2,369,795 | Planiol et al. | Feb. 20, 1945 |
| 2,402,467 | Thompson | June 18, 1946 |
| 2,469,669 | Storey | May 10, 1949 |

FOREIGN PATENTS

| Number | Country | Date |
|---|---|---|
| 792,405 | France | Oct. 21, 1935 |